United States Patent [19]

Mikio

[11] Patent Number: 4,617,740
[45] Date of Patent: Oct. 21, 1986

[54] MEASURING DEVICE FOR A FIGURE

[76] Inventor: Kobayashi Mikio, 3-14-20 Sakura, Satagaya, Tokyo, Japan

[21] Appl. No.: 748,308

[22] Filed: Jun. 24, 1985

[30] Foreign Application Priority Data

Jun. 22, 1984 [JP]  Japan ................................. 59-129550
Jul. 30, 1984 [JP]  Japan ................................. 59-160962
Jan. 29, 1985 [JP]  Japan ............................ 60-11452[U]

[51] Int. Cl.⁴ ........................... G01B 5/26; G01B 7/32
[52] U.S. Cl. ..................................... 33/122; 33/1 C; 33/123
[58] Field of Search ................. 33/1 C, 121, 122, 123, 33/124

[56] References Cited

U.S. PATENT DOCUMENTS

| | | | |
|---|---|---|---|
| 2,993,278 | 7/1961 | Lory | 33/122 |
| 3,121,956 | 2/1964 | Philbin | 33/121 |
| 4,246,703 | 1/1981 | Robinet | 33/430 |
| 4,253,239 | 3/1981 | Houck | 33/141 R |
| 4,383,301 | 5/1983 | Morita et al. | 33/124 |
| 4,528,754 | 7/1985 | Houldsworth | 33/1 C |

FOREIGN PATENT DOCUMENTS 23487 6/1968 Japan ..................................... 33/1 C

OTHER PUBLICATIONS

Aristo, "Planimeters, Integrators, Pantographs", 3-1959, pp. 101-108.
Biddle, "New Universal Planimeter", *Science*, 10-1913, p. XI.

*Primary Examiner*—Richard R. Stearns

[57] ABSTRACT

A measuring device for measuring characteristics of a drawing in which a carriage is supported by a pair of wheels for reciprocal motion on a line. A carriage pulse generator produces pulses proportional to the angle of rotation of the wheels rotatably supported at one end. A tracing lever extending from the carriage has a tracing implement on the other end. A tracing lever pulse generator generates pulses proportional to the rotational motion of the tracing lever. A phase signal generator receives signals from the tracing lever pulse generator and generates a phase angle signal received by a calculator in the carriage. The phase angle signals and pulses from the tracing lever pulse generator we used by the calculator to determine one or more characteristics of the drawing being measured by the tracing implement.

10 Claims, 15 Drawing Figures

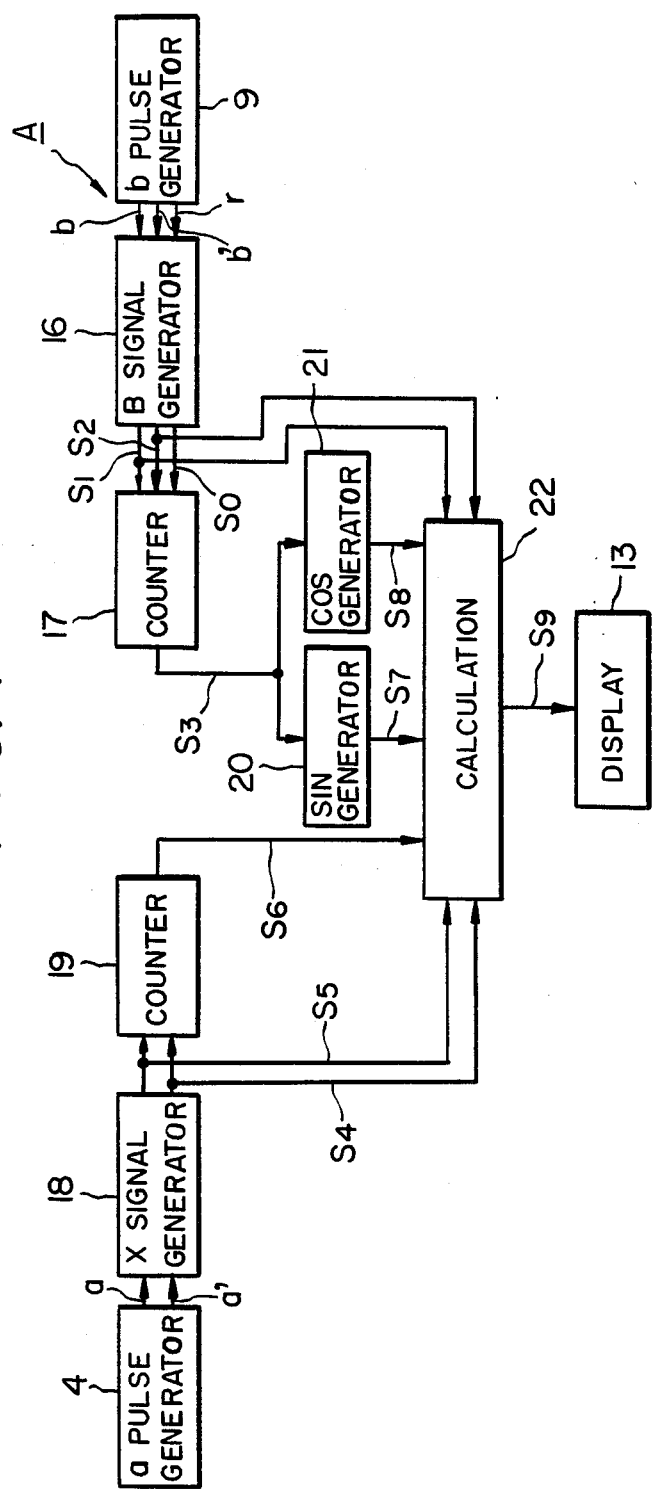
F I G. 4

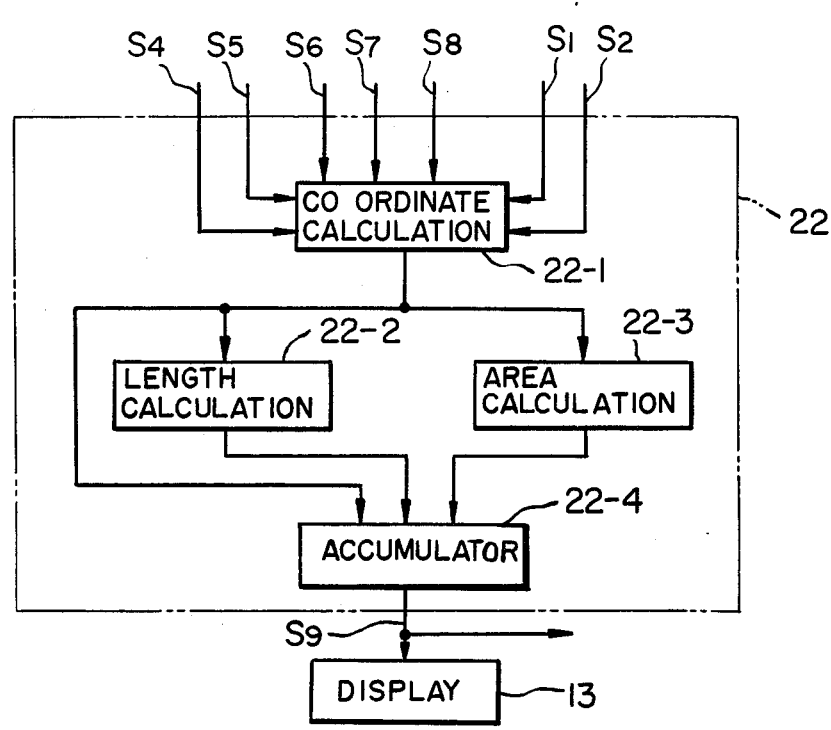
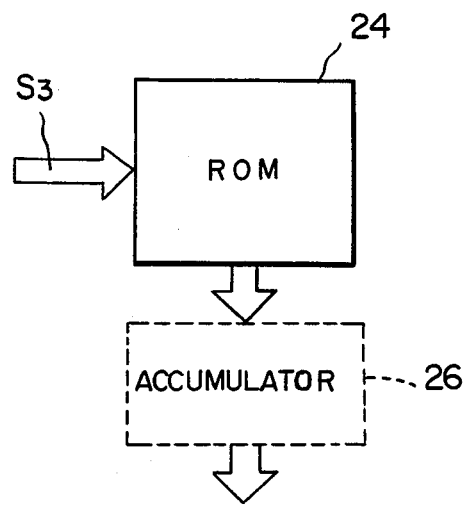

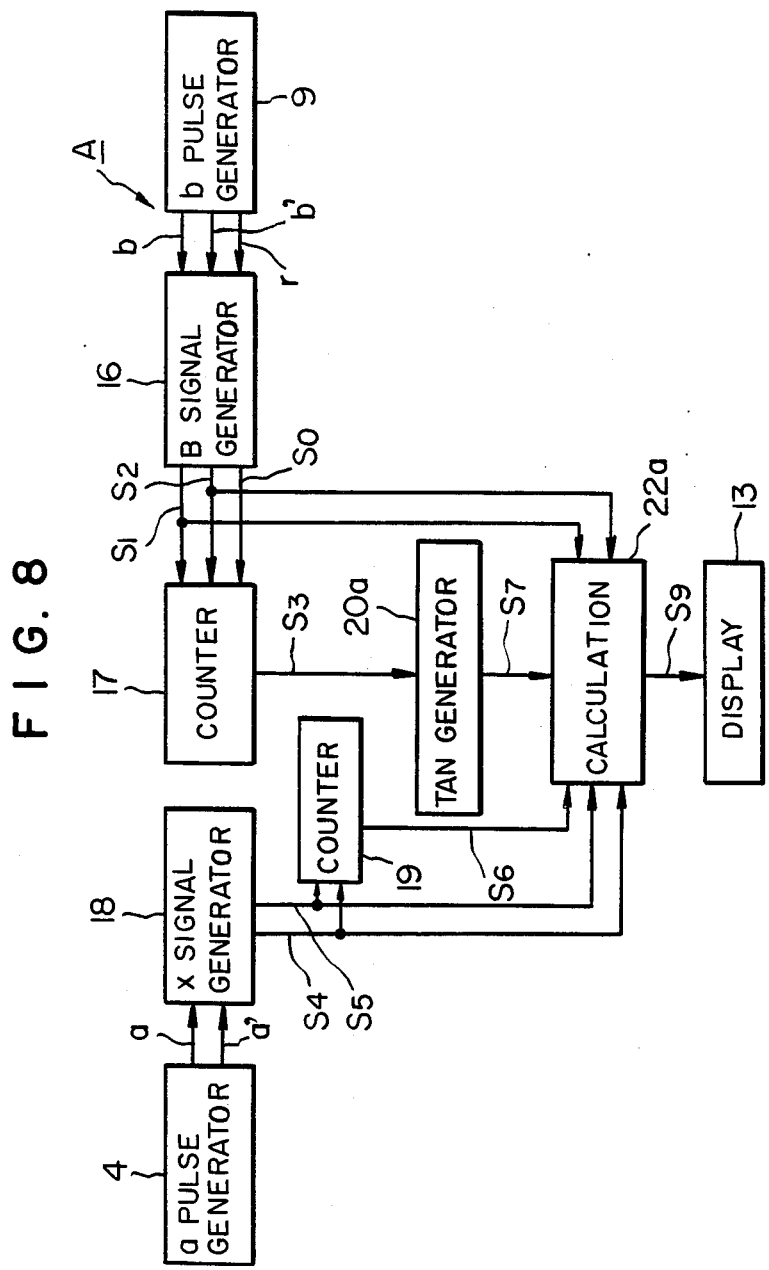

F I G. 10
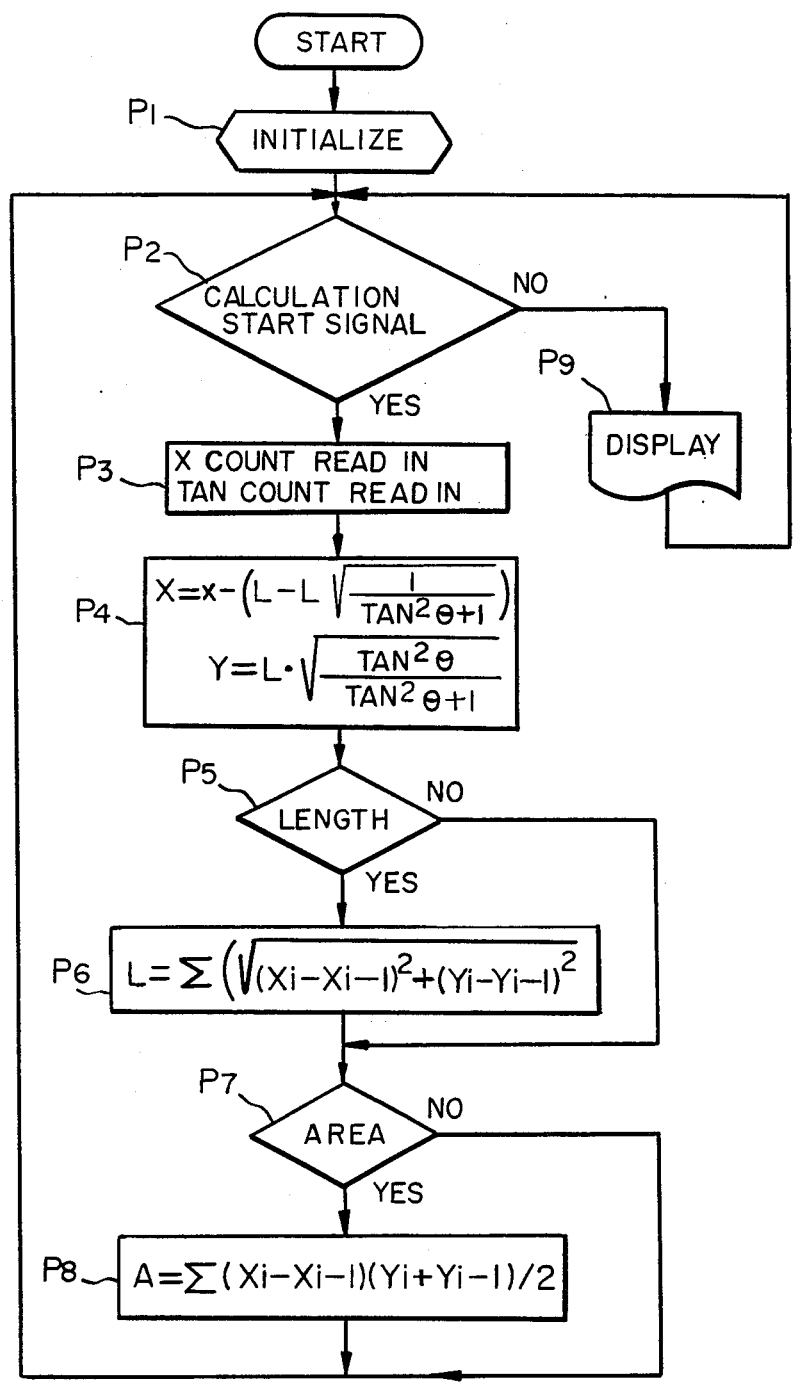

MEASURING DEVICE FOR A FIGURE

FIELD OF THE INVENTION

This invention relates to a measuring device for a figure such as linear planometer for measuring the area of the closed curve, length between two points on a curve, or coordinates of points.

BACKGROUND OF THE INVENTION

A planometer is generally used for measuring the area of a closed curve. As is known in a planometer, a tracing lens or tracing needle is moved along the figure to be measured, while an integral wheel rolls on the plane of the figure in a right angle direction against the direction of movement of a tracing lens or tracing needle by frictional force between the plane and integral wheel. However irregularities in the friction of the plane or slipping of the integral wheel due to the smoothness of a plane (less friction) can produce errors. The displacement of the integral wheel is read visually and measurements provided by the integral device with the aid of a vernier at the beginning and end of the measuring, but reading errors are inevitable. Of course resetting of the device to zero is provided by the integral device, usually by a push botton, but is a delicate operation.

In the linear planometer, a carriage is supported by a pair of wheels which move reciprocally along a straight line. To prevent the wheels from slipping, a friction ring is provided around the periphery of each wheel comprised of an electrodeposited diamond powder which is not entirely satisfactory. Widening of the friction ring is not effective because uneveness of the diamond powder occurs.

BRIEF DESCRIPTION OF THE INVENTION

This invention is intended to eliminate the above drawbacks of resetting an integral device and slipping of the integral wheel or pair of wheels on the carriage. In the present invention, a carriage is supported by a pair of wheels, and a measuring lever is supported for rotation about a vertical shaft on the carriage. The rotation angle of the wheel is accounted for by pulses from a pulse generator, while the rotation angle of the measuring lever is also being accounted for by pulses from another pulse generator. A tracing needle or lens is provided at the end of the measuring lever; the position of the tracing lens or needle being along rectangular coordinates X, Y. The X coordinate is determined or calculated from the sine and cosine, while the coordinate Y is determined or calculated from the cosine B. Area or length of the curve to be measured may then be calculated. For these purposes, a sine generator cosine generator or tangent generator are provided By this generator, an integral wheel or integral device which responds to a detected sine signal is eliminated and problems due to slipping are avoided.

Other objects of this invention are to provide measuring device for a figure in which a plurality of friction rings are provided on the wheel supporting the carriage.

BRIEF DESCRIPTION OF THE DRAWINGS

FIG. 4 is a simplified block diagram of the electronic circuit of the embodiment of FIG. 1.

FIG. 5 is a simplified block diagram of a calculating circuit for the invention.

FIG. 7 is a block diagram of a calculating circuit for another embodiment of the invention.

FIG. 8 is a block diagram of a calculating circuit for still another embodiment of the invention.

FIG. 10 is a flow chart illustrating of the calculating steps.

DETAILED DESCRIPTION OF THE INVENTION

Figure 1:
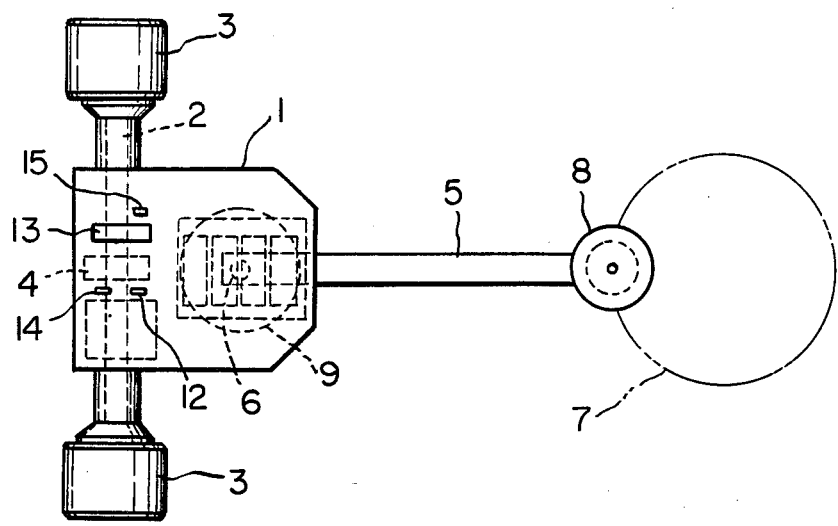
FIG. 1 is a plan view of one embodiment of the invention.
Figure 2:
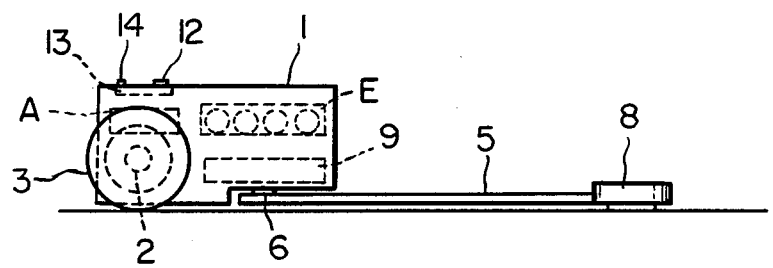
FIG. 2 is a side view of the embodiment of FIG. 1.
Figure 3:
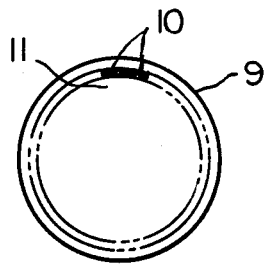
FIG. 3 is a side view of the wheel supporting carriage.

FIGS. 1 through 6 show one embodiment of the invention applied to a linear planometer. As shown in FIGS. 1 and 2, carriage 1 is supported by a pair of wide width wheels 3, at opposite ends of shaft 2 so as to move reciprocally along a straight line. In carriage 1, pulse generator 4 is provided for producing a series of pulses whose number is proportional to the rotation angle of wheels 3. Measuring lever 5 is rotatably supported on carriage 1 for rotation about vertical shaft 6. At the end of measuring lever 5, measuring lens 8 is provided for tracing a FIG. 7 to be measured. In carriage 1, pulse generator 9 is provided for producing a series of pulses b whose number is proportional to the rotation angle B of measuring lever 5. As shown in FIG. 3 measure 10 producing pulses b and measure 11 for producing original point signals are provided in a pulse generator 9.

The system has a clear switch 12, display device 13, power switch 14, selection switch 15 and battery case E, and calculating circuit is designated A.

Operation of the device is as follows:

As shown in FIG. 1, carriage 1 is placed on drawing FIG. 7 and measuring lever 5 rotated so as to pass an original measuring position 11. Generator 9 then generates signal r as shown in FIG. 4. Signal generator 16 generates a clear pulse signal SO, clearing counter 17 to zero for counting pulses b. Thus, as an operator begins tracing FIG. 7, to be measured, generator 9 generates pulses b and b', which is a signal phase shifted from signal b, for discriminating the direction of rotation. Signal generator 16 generates signals S1, S2, which counter 17 counts and integrates generating an accumulated signal S3 corresponding to rotation angle B of measuring lever 5 and transmits signal S3 to sin generator 20, and cos generator 21. Pulse generator 4 generates pulses a and a', phase shifted from pulse a, for discriminating the direction of rotation. Signal generator 18 generates positive signal S4 and negative signal S5, and transmits signals S4, S5 to counter 19 which counts and integrates the signals and generates accumulated signal S6 corresponding to the rotation angle of wheels 3. (i.e., Signal 56 from generator 19, sine signal S7 from sine generator 20 and cosine signal S8 from cosine generator 21 are fed to calculation part 22.) Signals S1, S2, S4, S5 are also fed to calculation part 22 as synchronizing signals. Thereby signals S6, S7, S8 are received by calculation part 22 synchronously with one of signals S1, S2, S4, S5, and calculated. As shown in FIG. 5 calculation part 22 has coordinate calculation part 22-1, length calculation part 22-2 and area calculation part 22-3. Coordinate 22-1 performs the following calculation:

$$X = X - (L - L \cos B)$$
$$Y = L \sin B \qquad (1)$$

where L means: length of measuring lever 5 (distance between center of shaft 6 and measuring lens 8). Length calculation part 22-2 performs the following calculation:

$$\text{Length} = \overline{(X_i - X_{i-1})^2 + (Y_i - Y_{i-1})^2} \qquad (2)$$

Area calculation part 22-3 performs the following calculation:

$$\text{Area} = (X_i - X_{i-1})(Y_i - Y_{i-1})/2 \qquad (3)$$

Resultants of the calculations are fed to accumulator 22-4 and resultant S9 is displayed or output. The function of calculating part 22 is performed by a computer (not shown) and FIG. 6 shows the flow of a computer program.

Figure 6:
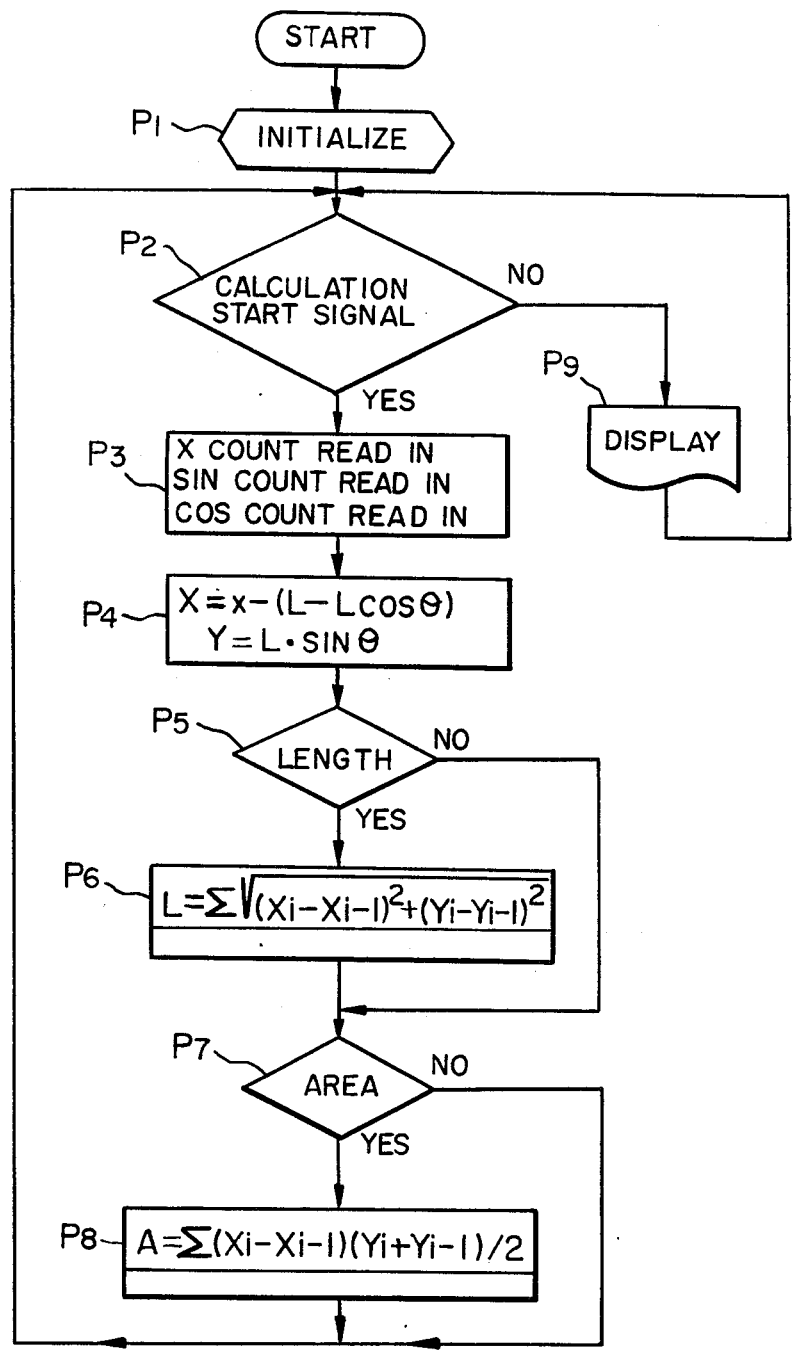
FIG. 6 is a flow chart of the calculating circuit of the invention.

As shown in FIG. 6, after starting, step P1 initializes and step P2 tests for the existence of calculation start signals S1, S2, S4, S6. If yes, step P3 reads x, signal S6, sine signal S7, and cosine signal S8. At step P4 the calculation of formula (1) is performed and then step P5 tests for calculation of length by reference to switch 15. If yes, step P6 calculates formula (2) and goes to step P7 which tests for the calculation of area by reference to switch 15. If yes, performance of step P8 calculation of formula (3) is performed.

In said embodiment, sine generator 20 and cosine generator 21 require use of an operator, which takes time. To eliminate this defect a table system generator can be used. The embodiment of FIG. 7 uses a ROM (Read Only Memory) to memorize the table of sine or cosine for each address. Signal S3 designates the address and the corresponding sine or cosine values are read out instantaneously. The ROM memory may be the difference of each sine or cosine value. (In this case an accumulator 6 as shown in dotted lines may be required.) This system saves capacity.

After step P8, the signal flow returns to step P2 and the operations are repeated. If measurements are stopped, step P2 returns a NO and goes to step P9 to display the resultant.

Figure 9:
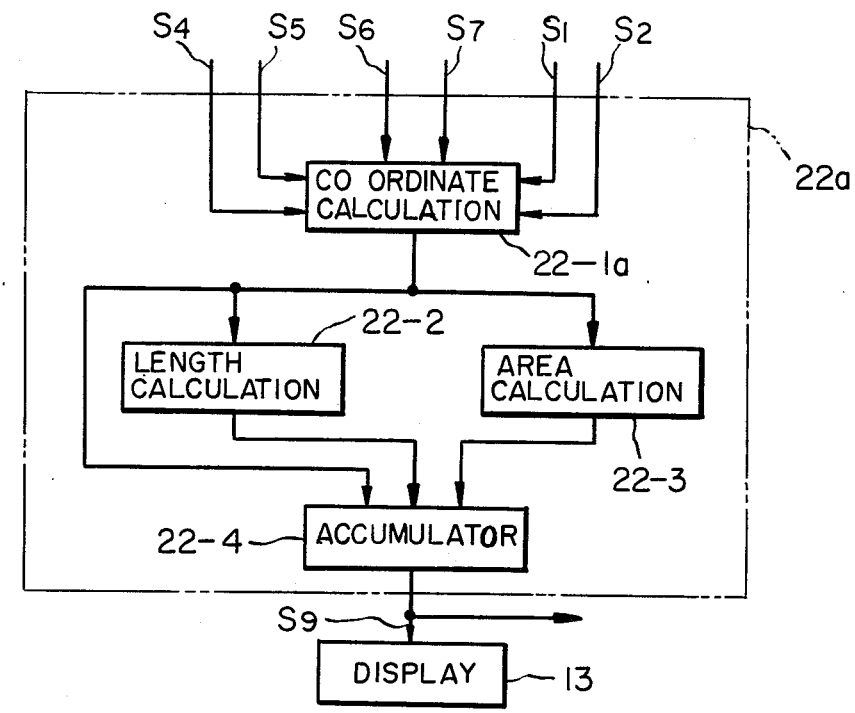
FIG. 9 is a block diagram of the calculating circuit of the embodiment of FIG. 8.

FIGS. 8 through 10 show another embodiment of the invention in which a tengent generator 10a is used instead of sine generator 20 and cosine generator 21 (FIG. 8). The system of FIG. 9 is almost the same as FIG. 5 but the function of calculating part 22-1a differs. Calculating part 22-1a performs the following calculations:

$$X = x - (L - L\,\overline{1/\tan^2 B + 1})$$
$$Y = L\,\overline{\tan^2 B/\tan^2 B + 1} \qquad (4)$$

The flow diagram of FIG. 10 is almost the same as FIG. 6 but calculations at step P4 differs. At step P4, the calculations of equations (4) are performed.

Figure 11:
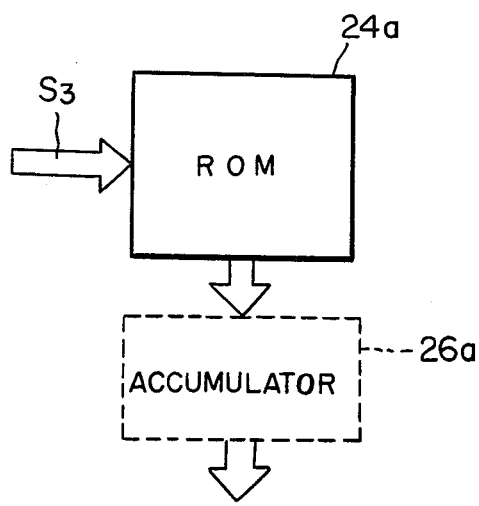
FIG. 11 is a block diagram of a calculating circuit for still another embodiment of the invention.

The system of FIG. 11 is almost the same as FIG. 7. In this embodiment, ROM 24a memorizes a tangent table for high speed measuring instead of tangent generator 20a. The memory in ROM 24a may be the difference of each tangent value. In this case, an accumulator 26a shown in dotted lines may be required.

Figure 12:
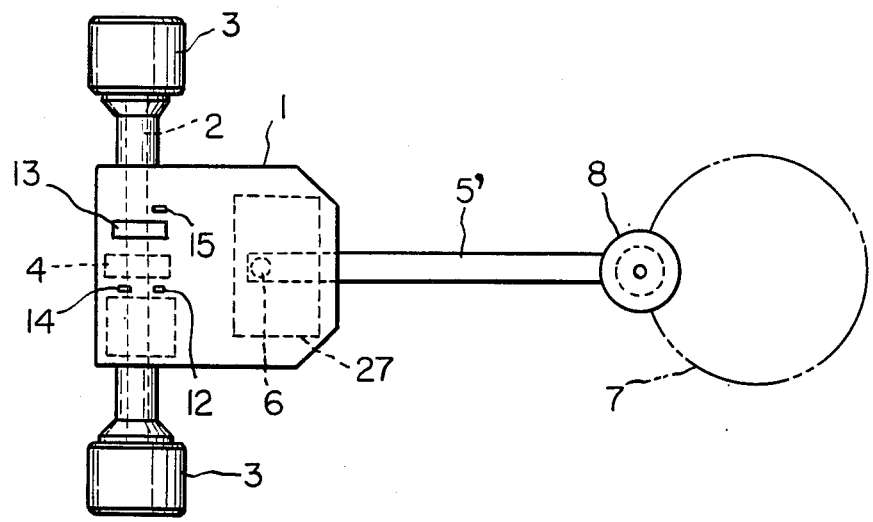
FIG. 12 is a plan view of still another embodiment of the invention.
Figure 13:
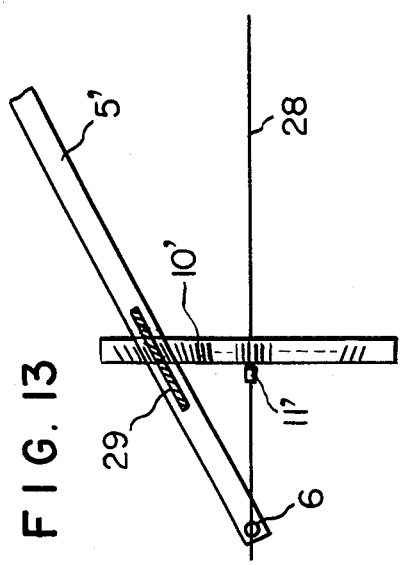
FIG. 13 is a plan view of a tangent generator.
Figure 14:
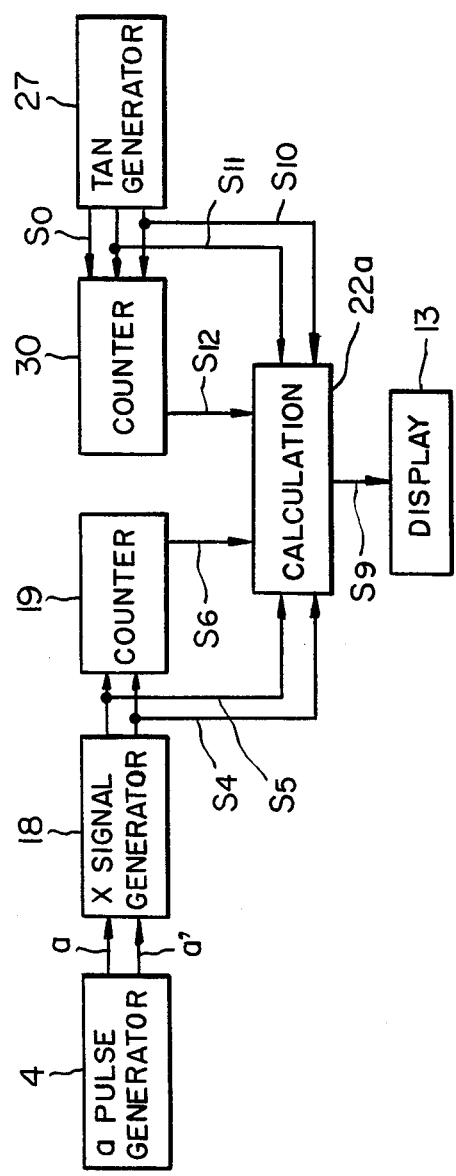
FIG. 14 is a block diagram of a circuit for the embodiment of FIG. 13.

FIGS. 12 to 14 show still another embodiment of this invention, in which a tangent generator 27 is provided in carriage 1. FIG. 13 is an example of a tangent generator 27. Linear measure 10' is provided at right angles to centerline 28 passing through the center of vertical shaft 6. Original measure 11' is provided on center line 28. Encoder (or reader) 29 is provided on and extends along measuring lever 5' for reading measurments 10' and 11'.

Operation of this device is shown in FIG. 14 which is substantially similar to FIGS. 4 and 8. When measuring lever 5' passes original measure 11 initially, tangent generator 27 (i.e., encoder 29) generates signal S0 and counter 30 is reset to zero. Then generator 27 generates signals S11, S10 which are counted in counter 30. Counter 30 counts signals 10 and accumulates them. Tangent signal S12 from counter 20 is fed to calculating part 22a. Other operations are performed as described above with respect to the previous embodiments.

Figure 15:
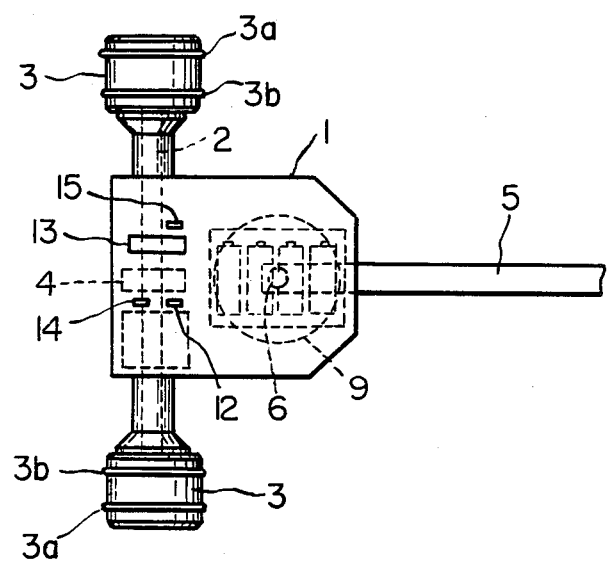
FIG. 15 is a plan view of yet another embodiment of the invention.

FIG. 15 shows another embodiment of this invention, in which friction rings 3a, 3b are provided on wheels 3 supporting carriage 1 to minimize slippage As explained above, in this invention, the coordinates of the points of a figure, length of a curved line and area of a closed figure can be measured without using an integral wheel and device, so that problems of slippage are avoided and each value can be accurately measured. Moreover, with a plurality of friction rings firmly in contact with the surface of a figure on drawings slip problems due to the wheel supported carriage are avoided.

This number is not to be linked by the embodiments shown in the drawings and described in the description, which is given by way of example and not of limitation, but only in accordance with the scope of the appended claims

I claim:

1. A measuring device for a figure comprising; a carriage supported by a pair of wide width wheels so as to reciprocally move along a straight line; a carriage pulse generator for producing a series of pulses whose number is proportional to the rotation angle of said wheels; a measuring lever rotatable supported on said carriage about a vertical shaft; tracing means on the end of said measuring lever; a measuring lever pulse generator for producing a series of pulses whose number is proportional to the rotation angle of the said measuring lever; a sine angle signal generator and cosine angle signal generator for generating signals from signals received from said measuring lever pulse generator; and calculating means for calculating coordinate, length and area from said sine and cosine signals and signals from said measuring lever pulse generator.

2. A measuring device according to claim 1 including; a plurality of friction rings provided on said pair of wide width wheels.

3. A measuring device for a figure comprising; a carriage supported by a pair of wide width wheels so as to reciprocally move along a straight line, a carriage pulse generator for producing a series of pulses whose number is proportional to the rotation angle of said wheels, a measuring lever rotatably supported on said carriage about a vertical shaft, tracing means on the end of said measuring lever, a measuring lever pulse generator for producing a series of pulses whose number is proportional to the rotation angle of said measuring lever, a tangent signal generator, and calculating means for calculating coordinate, length and area from said tangent signals and signals from said measuring lever pulse generator.

4. A measuring device according to claim 3 including; a plurality of friction rings provided on said pair of wide width wheels.

5. A measuring device for measuring characteristics of a figure comprising; carriage means, said carriage means being supported by a pair of wide wheels for a reciprocal motion along a line; carriage pulse generating means for producing pulses proportional to the angle of rotation of said wheels; tracing lever means having one end rotatably supported on said carriage means; tracing means on the other end of said rotatably supported tracing lever means; tracing lever pulse generating means for generating pulses proportional to the rotational motion of said tracing lever means; phase angle signal generating means for receiving and generating phase angle signals from said tracing lever pulse generating means; and calculating means receiving said phase angle signals and said pulses from said tracing lever pulse generating means, said calculating means calculating the value of one or more characteristics of said drawing measured by said tracing means.

6. The measuring device according to claim 5 including; counting means counting the pulses generated by said tracing lever pulse generating means; and signal generating means generating a phase shifted signal from said tracing lever pulse generating means.

7. The measuring device according to claim 6 in which said calculating means includes; a coordinate calculator; a length calculator; an area calculator; and, accumulating means receiving and accumulating the output from said coordinate, length and area calculators.

8. The measuring device according to claim 7 including; display means for displaying the output of said accumulating means.

9. The measuring device according to claim 8 in which said phase angle signal generating means comprises sine and cosine signal generating means.

10. The measuring device according to claim 9 in which said phase angle signal generating means comprises tangent signal generating means.

* * * * *